March 26, 1957    J. H. HERRERA    2,786,408
APPARATUS FOR SUPPLYING A FIXED AMOUNT
OF HOT WATER TO AN INFUSOR
Filed Sept. 13, 1954

INVENTOR:
Juan Hernandez Herrera,
BY Singer, Stern & Carlberg
ATTORNEYs.

United States Patent Office 2,786,408
Patented Mar. 26, 1957

2,786,408

APPARATUS FOR SUPPLYING A FIXED AMOUNT OF HOT WATER TO AN INFUSOR

Juan Hernandez Herrera, Havana, Cuba

Application September 13, 1954, Serial No. 455,549

1 Claim. (Cl. 99—283)

This invention relates to devices for supplying a fixed volume of water to a strainer for vegetable infusions, such as coffee, and it has for its object to provide a system of apparatus for heating water and supplying a fixed volume of hot water to a strainer of that kind, for quick service at cafes, restaurants, hotels, etc. where there is a demand for the so-called instantaneous coffee. The system of apparatus of this invention comprises a big open tank adapted to contain water and to heat it therein, within which is arranged a small sealed tank adapted to contain a fixed volume of water to be supplied to a strainer, said small tank having a sole opening at its top portion adapted to be alternatively closed and opened by means of a hinged lid that is caused to open into the small tank by the pressure of the water contained in the outer tank and is caused to close said opening as compressed air is injected into the small tank to force out the hot water contained therein. The big tank is provided with a float-actuated device for supplying cool water into same as the level of the water contained therein descends, and the small tank is in communication through a tube with the valve of a strainer for vegetable infusions and is also in communication through another tube with a magnetic valve actuated by an electric time switch, and has two ways, one for the exit of air contained within the small tank when the latter has been emptied and is again refilled, and another way for allowing the passage into the small tank of compressed air from an air compressor with which the magnetic valve is likewise communicated. In this manner, in one operation the small tank will be filled automatically with hot water from the outer tank, and in another operation, by putting off the electric time switch, compressed air from the air compressor will be injected into the small tank, air pressure causing the hinged lid to close the top portion of the small tank and causing compressed air to inject the water contained in the small tank into the strainer valve preparatory to the straining operation, the whole being effected as quickly and efficiently as is required for straining instantaneous coffee.

The invention is described with reference to the figures of the accompanying drawing, of which:

Figure 1:
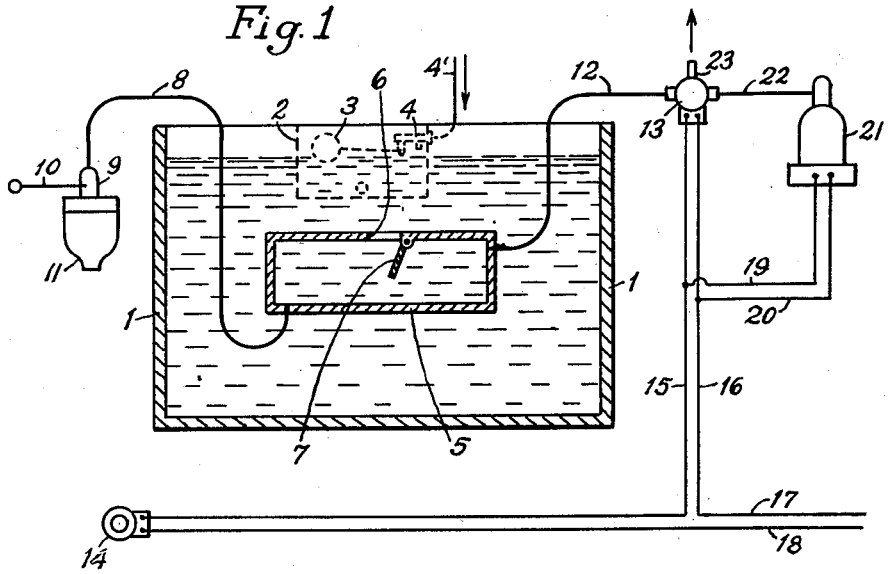
Fig. 1 is a schematic elevational view of the system of apparatus of this invention, showing in open position the opening of the inner small tank adapted to be filled with hot water from the outer tank.
Figure 2:
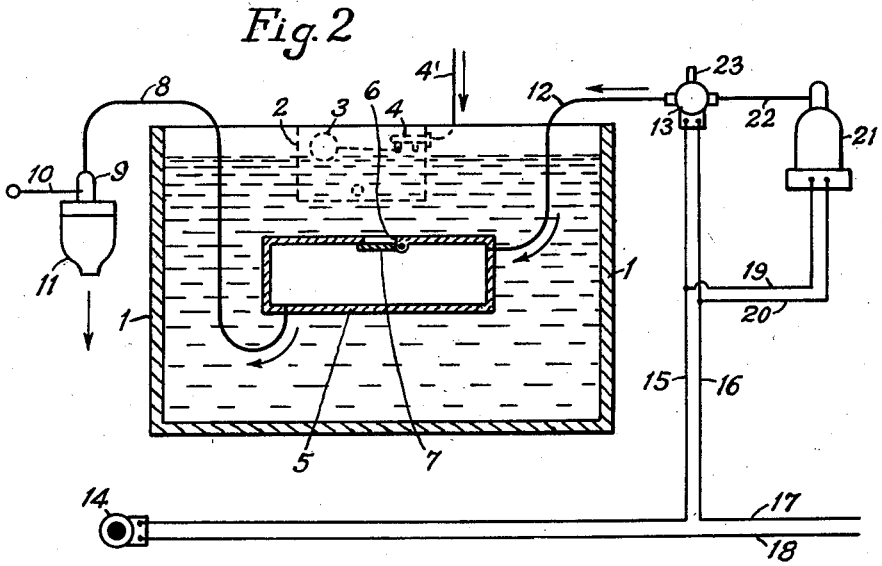
Fig. 2 is a schematic view similar to that of Fig. 1, showing in closed position the opening of the inner tank, as the electric time switch is put off and the pressure by compressed air from the air compressor throws water contained in the inner tank towards the inlet valve of the strainer.

This system of apparatus is composed of a big tank 1 open on top which is fed with cool water from a small tank 2 arranged on the top portion thereof and being provided with a float device 3 so that it will automatically open a spout 4 for admission of cool water from a supply pipe 4' when the water contained in tank 1 descends below a given level. Within the tank 1 is arranged a small sealed tank 5 provided with a single opening 6 on top thereof, which opening is adapted to be closed by an inwardly opening hinged lid 7. Said small tank 5 is in communication through a tube 8 with a valve 9 actuated by the handle 10 of a strainer 11 for vegetable infusions, said tube 8 being connected with the bottom of the small tank 5. The latter tank is in communication through another tube 12 connected at the top portion of an end wall thereof with a magnetic valve 13 situated outside the tank 1 and electrically connected by way of two electrical conductors 15 and 16 with an electric supply line 17—18 in which an electric time switch 14 is intercalated. In turn, both electrical conductors 15 and 16 are shunted to two electric conductors 19 and 20 being connected with an air compressor 21 which is in communication through tube 22 with the magnetic valve 13 which is provided with a tube 23 for outside discharge of the air expelled from the small tank 5 as same is filled with hot water from the tank 1.

For straining in strainer 11, two operations must be performed, to wit: in one operation, assuming the small tank 5 is filled with hot water and the hinged lid 7 is opened, upon putting off the electric time switch 14, the latter will operate the magnetic valve 13 thereby opening the communication with the air compressor 21 which will inject compressed air into the small tank 5, air pressure causing the hinged lid 7 to close and the water contained in the small tank 5 to be thrown towards valve 9 of strainer 11, once said valve opened by means of handle 10, and at the end of the period for which the electric time switch 14 has been set, the latter will be automatically opened whereupon the magnetic valve 13 will return to its normal position in which it will prevent the passage of compressed air from the already stopped air compressor, and the small tank 5 will become filled by the pressure of hot water contained in the big tank 1, which pressure will cause the hinged lid 7 to open into the small tank 5, the air contained in the small tank 3 finding its way to the atmosphere through valve 13. Thereafter the system of apparatus is ready for a new cycle of operations for straining and renewing the fixed volume of hot water.

It is obvious that changes may be made in the shape and size of the big tank and the smaller tank arranged therein, without thereby altering the essential character of the invention which is such as claimed hereinafter.

What I claim is:

In an apparatus for supplying a predetermined volume of hot water to a strainer for vegetable infusions, a tank having an open top and adapted to be heated, float control means for supplying said tank with water of a predetermined height, from a supply line, a relatively smaller tank arranged within said first tank and in spaced relation from the walls of said first tank, and having a single opening at its top portion, a valve for said opening adapted to move inwardly and permit water to enter said smaller tank and permit a predetermined volume of water to fill said tank through said opening, an infusor apparatus of the strainer type, a duct connecting said smaller tank to said infusor strainer, a compressor having its discharge port connected to said tank by means of another duct, a motor for operating said compressor, a magnetically operated valve having a vent port interposed in said last named duct to cut off the discharge port of said compressor with said smaller vessel and simultaneously permit said smaller vessel to be vented, an electric circuit including a source of electrical energy connected to said compressor motor and electro-magnetically operated valve in shunt, and a time controlled switch in said circuit for closing said circuit at predetermined time intervals and permit said compressor to be operated and simultaneously open the passage duct between the discharge of said compressor and smaller tank so that the predetermined volumetric contents thereof will be discharged through said infusor filter, said circuit being normally open to permit said electro-magnetic valve to assume a position in which the vent opening thereof is in communication with said smaller vessel.

References Cited in the file of this patent
UNITED STATES PATENTS

| | | |
|---|---|---|
| 1,160,684 | Ball | Nov. 16, 1915 |
| 2,065,211 | Carvalho | Dec. 22, 1936 |
| 2,462,019 | Bowman | Feb. 15, 1949 |
| 2,464,862 | Herrera | Mar. 22, 1949 |
| 2,568,840 | Zees | Sept. 25, 1951 |
| 2,663,248 | Johnson | Dec. 22, 1953 |

FOREIGN PATENTS

| | | |
|---|---|---|
| 458,466 | France | Aug. 7, 1913 |
| 689,600 | France | May 27, 1930 |